(No Model.)
W. X. STEVENS.
PROCESS OF MAKING COMBINED WIRE AND PICKET FENCES.
No. 383,022. Patented May 15, 1888.
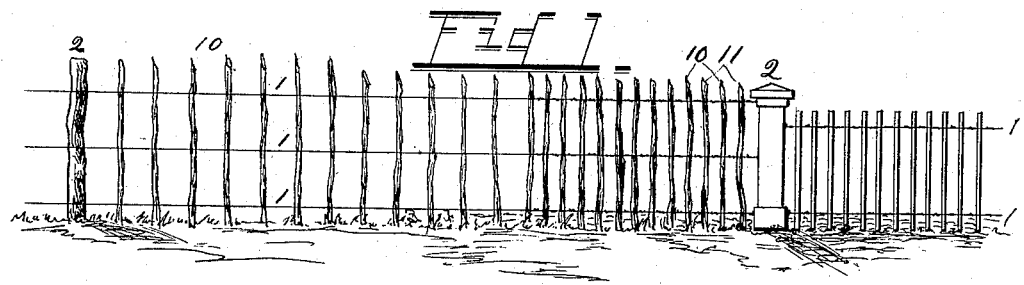
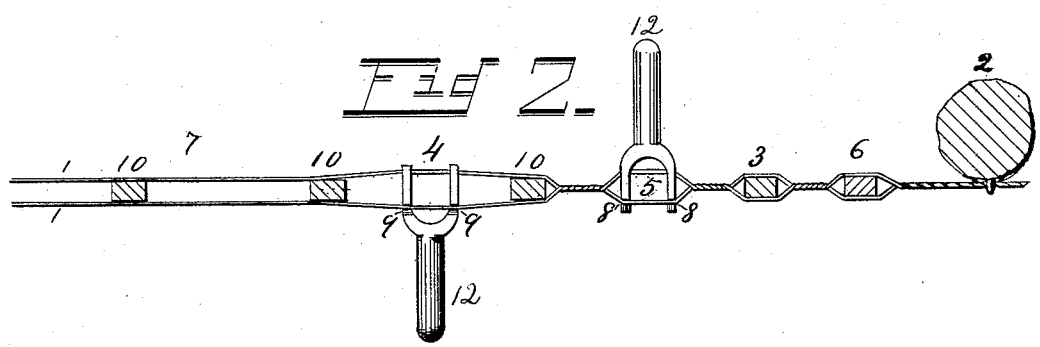
Witnesses.
S. E. E. Stevens.
P. E. Stevens.
Inventor.
William X. Stevens.

UNITED STATES PATENT OFFICE.

WILLIAM X. STEVENS, OF WASHINGTON, DISTRICT OF COLUMBIA.

PROCESS OF MAKING COMBINED WIRE AND PICKET FENCES.

SPECIFICATION forming part of Letters Patent No. 383,022, dated May 15, 1888.

Application filed August 20, 1886. Serial No. 211,437. (No model.)

*To all whom it may concern:*

Be it known that I, WILLIAM X. STEVENS, a citizen of the United States, residing at Washington, in the District of Columbia, have invented certain new and useful Improvements in the Process of Making Combined Wire and Picket Fences; and I do hereby declare the following to be a full, clear, and exact description of the invention, such as will enable others skilled in the art to which it appertains to make and use the same.

This invention relates to a process of making combined wire and picket fences, and its object is to provide simple means for making such fences rapidly on the field or in the shop, whereby the farmer may be enabled to construct his own fences without any expensive tools, while taking advantage of the great economy in timber known to be derived from dividing the same into small pickets or using saplings and small limbs for pickets and supporting them in line in an upright position by means of horizontal wires twisted upon the pickets and supported by posts, and whereby a combined wire and picket fence may be rapidly and economically manufactured for commerce.

To this end the invention consists in the process of making fences involved in the steps hereinafter described and claimed, reference being had to the accompanying drawings, in which—

Figure 1 is a front elevation of a partly-completed fence made by this process. Fig. 2 is a plan view, partly in horizontal section, of a portion of fence and two twisters, illustrating this process.

1 represents any suitable number of pairs of wires secured in a horizontal position in any usual manner upon supports—such, for instance, as the posts 2. Now, with the wires of each pair parted and parallel with each other—that is to say, not twisted—the picket or slat 3 is to be inserted between the wires at a distance from the post 2 equal to two spaces designed for the pickets of the fence when complete. Next comes the characteristic step of this process, as follows: The two wires are to be twisted together in two places at once between the post 2 and picket 3 forming a loop between the twists, into which another picket, 6, is to be placed. This may be done by using the implement 12, (shown in Fig. 2,) which is a forked lever-twister provided with notches 8 across the ends of its arms to receive one wire, and notches 9 across the arms near their shoulders to receive the other wire of a pair to prevent the two wires from drawing together at this point while being twisted. This twister is to be inserted between the two wires of a pair, as at 4, Fig. 2, and then turned to twist the wires together any required number of times, leaving an open space or loop between the wires and between the arms of the twister, as shown at 5, into which loop a picket may be inserted. Now, by turning the twister backward the wires will take against the sides of the picket and be stopped so that the twister may be removed. Then the wires spring tightly upon the last-inserted picket and secure it. By repeating these steps a fence may be produced, inserting and securing two pickets at every twist. Greater speed may be attained by first placing all the odd pickets, 10, in the whole length of a panel or space between posts and retaining them in position by any suitable device—such as a board with picket-space notches in its edge—and afterward twisting loops between these odd pickets, and placing in the loops of the even pickets, as before described, relative to picket 6. If there are two or more lines or pairs of wires one above another, as in Fig. 1, a lever should be furnished to each pair, and all the levers should be held after twisting, so that a picket may drop through them all before any one is released; otherwise the picket cannot be inserted. If the pickets were to be driven into the ground, one line of wires to secure their tops would answer the purpose.

With reference to securing a single picket in a fence it is only necessary to add that the post 2 and the picket 3 may be treated as both pickets or both posts, and the process of placing the picket 6 in the wires between them will be in either case the same as hereinbefore described relatively to picket 6.

To manufacture fence for commercial purposes by my process, it is only necessary to fix two posts at a suitable distance—say, one rod—apart, provide reels for coils of wire beyond one post, a reel for finished fence beyond the other post; then, having stretched the wires in pairs from the coils to the fence-reel, temporarily make the wires fast against the posts, and proceed to place first a set of odd pickets, then twist the wires in the spaces, and in these twists place the even pickets. Having thus made one panel, proceed to wind it upon the fence-reel after having secured the last end picket to its neighbor by a double hook or string to keep it from falling out. Then again fix the wires and add another panel to the first. A machine might be made for this purpose provided with a fork at every twist required in a panel and all the forks geared to be operated by a single sweep of a long lever. In that case the steps to form a rod of fence with two pickets to a foot would be to first place sixteen pickets between the open wires; second, twist loops in the wires between the pickets; third, place sixteen more pickets in the twisted loops and release the fence from the twisters. In other wire and picket fences the wires have to be twisted every time one picket is inserted. In my process two pickets are inserted and secured at every twist of the wires. This process of making fence commends itself by its simplicity and rapidity of execution and the light expense of the tools needed.

If any smooth-ended stick was substituted as a twister and removed from the twister-loop, and the picket was afterward placed in the open loop so formed, all the advantages of this process would be obtained, except that the wires would have lost the tension given to them in twisting the loop, and consequently would not grasp the picket so firmly.

I am aware that pickets have before been placed between parallel wires and these wires afterward twisted between the pickets; but in that case every picket was thus fastened and there was no picket placed in the loop of the twist, as in mine.

In the present application my claim is confined exclusively to the process described, and I do not herein lay any claim to the implements and machines described or referred to.

What I claim as my invention, and desire to secure by Letters Patent, is—

1. The process of making combined wire and picket fence, which consists in first securing one or more pairs of wires upon supports; secondly, placing a series of pickets between the two wires of each pair, and, thirdly, twisting loops in the pairs of wires between the pickets so placed and placing other pickets in the said loops, substantially as shown and described.

2. The process of making combined wire and picket fence, which consists in first placing two or more pickets between one or more pairs of wires; secondly, twisting the two wires of each pair together in two places at the same time, forming loops between the said pickets, and then placing other pickets in the loops named, substantially as shown and described.

In testimony whereof I affix my signature in presence of two witnesses.

WILLIAM X. STEVENS.

Witnesses:
  THEO. MUNGEN,
  ALBERT SPEIDEN.